United States Patent [19]

Thornton

[11] Patent Number: 4,992,978
[45] Date of Patent: Feb. 12, 1991

[54] CROSS-PATH OPTIMIZATION IN MULTI-TASK PROCESSING

[75] Inventor: Douglas R. Thornton, Felton, Calif.

[73] Assignee: Wiltron Company, Morgan Hill, Calif.

[21] Appl. No.: 176,096

[22] Filed: Mar. 31, 1988

[51] Int. Cl.⁵ .............................................. G06F 9/00
[52] U.S. Cl. ............................... 364/900; 364/948.11
[58] Field of Search ... 364/200 MS File, 900 MS File; 371/29.1, 16.5

[56] References Cited

U.S. PATENT DOCUMENTS

| | | | |
|---|---|---|---|
| 4,500,954 | 2/1985 | Duke et al. | 364/200 |
| 4,571,674 | 2/1986 | Hartung | 364/200 |
| 4,639,917 | 1/1987 | Furnta | 371/16.5 |
| 4,661,953 | 4/1987 | Venkatesh et al. | 371/16.5 |
| 4,679,195 | 7/1987 | Dewey | 371/16.5 |
| 4,774,656 | 9/1988 | Quntse et al. | 371/29.1 |
| 4,792,918 | 12/1988 | Hirase et al. | 371/16.5 |

Primary Examiner—Raulfe B. Zache
Attorney, Agent, or Firm—Fliesler, Dubb, Meyer & Lovejoy

[57] ABSTRACT

Apparatus and method for performing optimized execution of a prior and a subsequent operations having common process steps. Each operation is partitioned into at least one process step, and the steps of each operation are assigned a path number. Execution of the process steps of each operation is controlled by a set of flags associated with the given operation. Upon invocation of two operations, the path numbers of the two operations are compared, to determine commonality of process steps between the operations. If common process steps exist, the flags of the subsequent operation corresponding to the common process steps are cleared, to prevent execution of the common process steps during the later execution of the subsequent operation. Upon completion of the common process steps during execution of the prior operation, an intermediate result is transferred to a storage associated with the subsequent operation, and the prior operation continues to completion. Execution of the subsequent operation will skip the common process steps, and will employ the stored intermediate result in the stead thereof. Thus, the apparatus and method prevent duplicitous and redundant execution of common process steps between the operations, maximizing operational efficiency.

30 Claims, 5 Drawing Sheets

T_OPTFLG[1]    T_OPTFLG[2]    T_OPTFLG[3]    T_OPTFLG[4]

PATH[1]    PATH[2]    PATH[3]    PATH[4]

T_COPYCH[1][2]

T_COPYCH[1][3]    T_COPYCH[2][3]

T_COPYCH[1][4]    T_COPYCH[2][4]    T_COPYCH[3][4]

CHANNEL 1    CHANNEL 2    CHANNEL 3    CHANNEL 4
RESULT       RESULT       RESULT       RESULT

CROSS-PATH OPTIMIZATION IN MULTI-TASK PROCESSING

CROSS-REFERENCE TO RELATED APPLICATIONS

U.S. patent application entitled "Microwave Measurement System And Associated Method", Ser. No. 07/176,202 invented by Martin I. Grace et al, filed on the same date as the present application, and owned currently and at the time of invention by a common assignee, is incorporated by reference.

LIMITED COPYRIGHT WAIVER

A portion of this patent document contains material to which a claim of copyright protection is made. The copyright owner has no object to the facsimile reproduction by anyone of the patent document, or the patent disclosure as it appears in the United States Patent and Trademark Office patent file records, but reserves all other rights whatsoever.

FIELD OF THE INVENTION

This present invention relates generally to processing of data, and more particularly to a method and apparatus for optimizing the processing of a given set of data with more than one operation to produce more than one result.

BACKGROUND OF THE INVENTION

In many data processing applications, it is often desirable to process a given set of data using different algorithms to obtain more than one result. For example, in electronic measuring and signal analysis systems, it is usually desirable to process concurrently the measured data of a target device with more than one algorithm, so that the results can be presented together to give a more comprehensive analysis of the device, and/or a better understanding of the measurement.

In prior art data processing systems, concurrent processing of data under a given number of different algorithms is typically accomplished by executing a corresponding number of independent tasks in parallel to produce the required results. However, as the throughput of a data processing system is usually inversely proportional to the number of tasks running therein, each initiation of a task would therefore increase the system workload, thereby reducing its throughput.

Unfortunately, throughput reduction is usually not tolerable in many data processing applications. For example, the useability of an electronic measuring system may be greatly degraded if, due to a heavy system workload, results of a measurement cannot be processed and displayed in a substantially instantaneous and simultaneous manner.

Thus, in systems where high speed processing is desired, there exists a need to reduce the overall amount of processing of a given set of data.

SUMMARY OF THE INVENTION

In one aspect, the present invention is a method in a data processing system for optimizing processing of a given set of data with more than one operation to produce more than one result. The method comprises the steps of: partitioning each operation of the system into at least one process step; upon completion of at least a first process step in a first operation to produce an intermediate result, communicating said intermediate result to a second operation having a process step equivalent to said first process step; and upon receiving said intermediate result, bypassing execution of said process step in said second operation.

In another aspect, the present invention is an apparatus in a data processing system for optimizing processing of a given set of data with more than one operation to produce more than one result.

The apparatus comprises a processing unit and a program which the processing unit executes to perform a plurality of operations to produce the plural results. Execution by the processing unit of a first operation to completion of at least a first process step produces an intermediate result. The processing unit communicates this intermediate result to a second operation which has a second process step equivalent to the first process step of the first operation. The processing unit bypasses execution of the second process step in the second operation upon receipt by the second operation of the intermediate result.

DESCRIPTION OF THE PREFERRED EMBODIMENT

Figure 1:
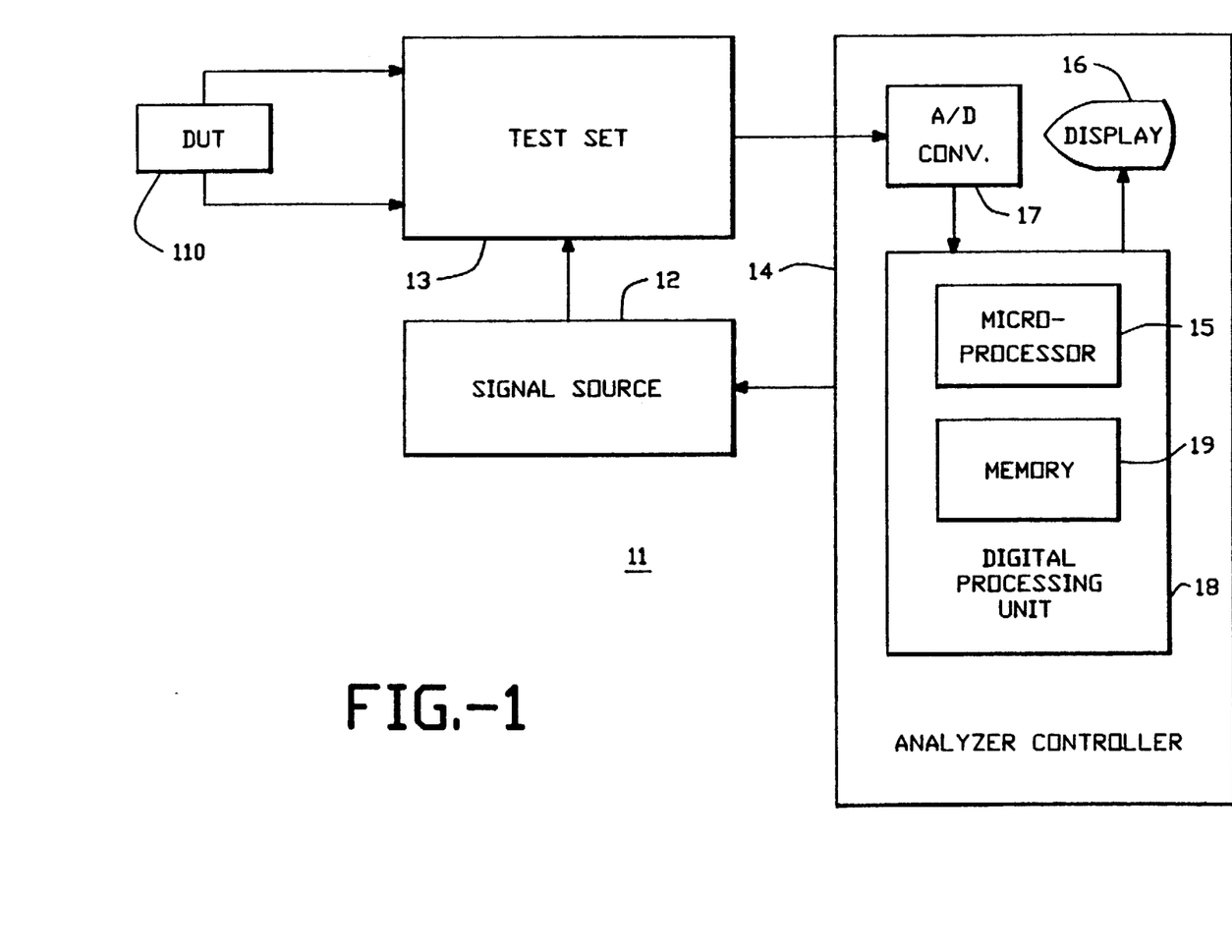
FIG. 1 is a block diagram of a network analyzer wherein the present invention is embodied.

Referring to FIG. 1, there is shown a preferred embodiment of the present invention in a network analyzer 11 such as the one disclosed in the above identified cross-reference application the network analyzer 11 comprises a signal source 12, a test set 13, and an analyzer controller 14. In the analysis of a device under test (DUT) 110 by the network analyzer 11, a stimulus signal is applied to the DUT 110 from the signal source 12. The test set 13 samples signals caused by the DUT 110 on the stimulus signal. These sampled signals will then be analyzed by the analyzer controller 14 to provide data for measuring parameters of the DUT 110, including its scattering (S—) parameters (referring to the forward reflection, forward transmission, reverse reflection and reverse transmission parameters).

The network analyzer 11 according to the preferred embodiment has four channels each of which can be used independently to provide data for analyzing the DUT 110.

When the sampled signals of a channel enter the analyzer controller 14, they are transformed into digital signals by an analog-to-digital (A/D) converter 17 so that they can be processed by the digital processing unit 18 into phase and magnitude data. The digital processing unit 18 includes a process 15 and memory 19, and is coupled to a display 16 wherein processed results are displayed.

During the analysis of a DUT 110, data from a channel is processed by the data processing unit 18 in more than one operation, based upon specified ones of a set of test options available in the analyzer. Such operations includes, for example, bandpass and lowpass processing of measured data from the DUT 110.

The operation to be performed on the data of a channel, CH, is specified as one or more process steps by setting entries in a flag labelled t_modflg[CH].

Figure 2:
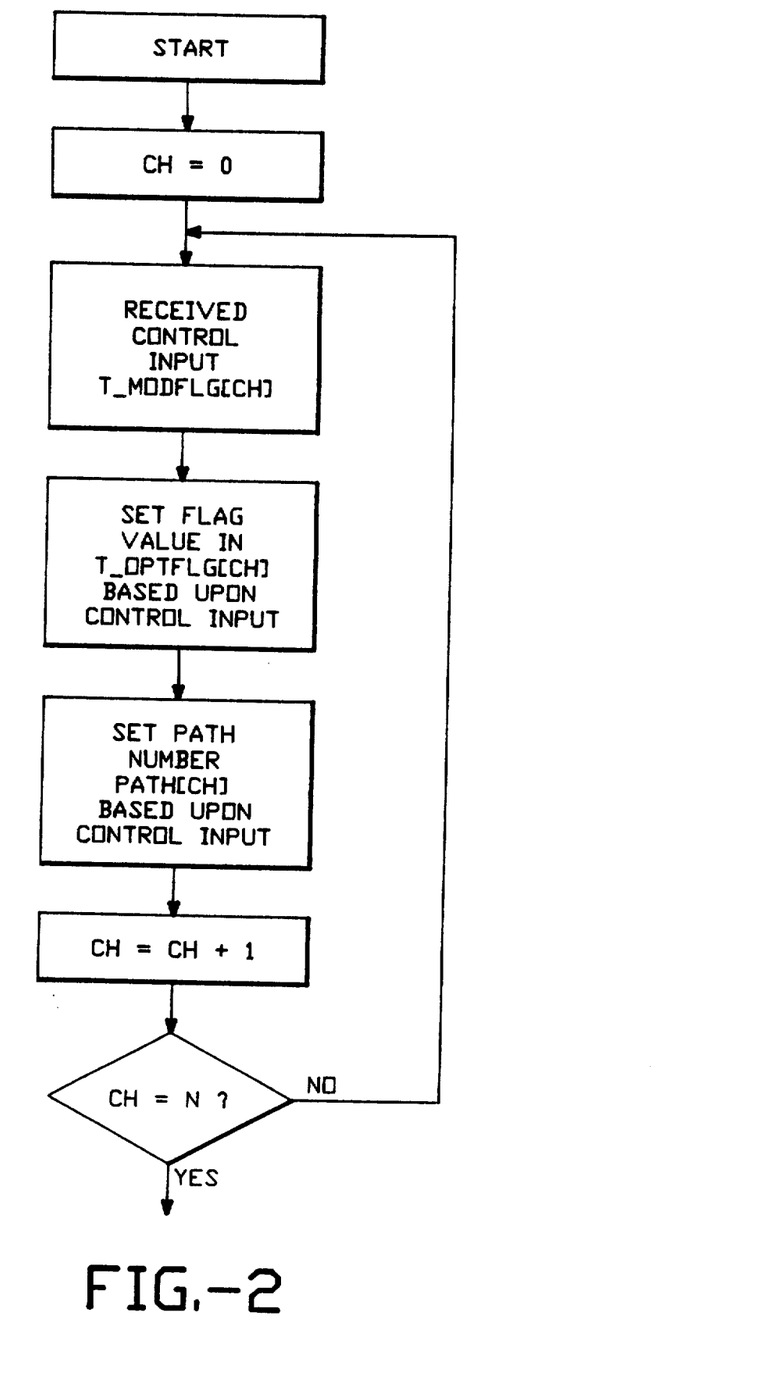
FIG. 2 is a flowchart of the steps for mapping control definition of a channel into a flow path.
Figure 3:
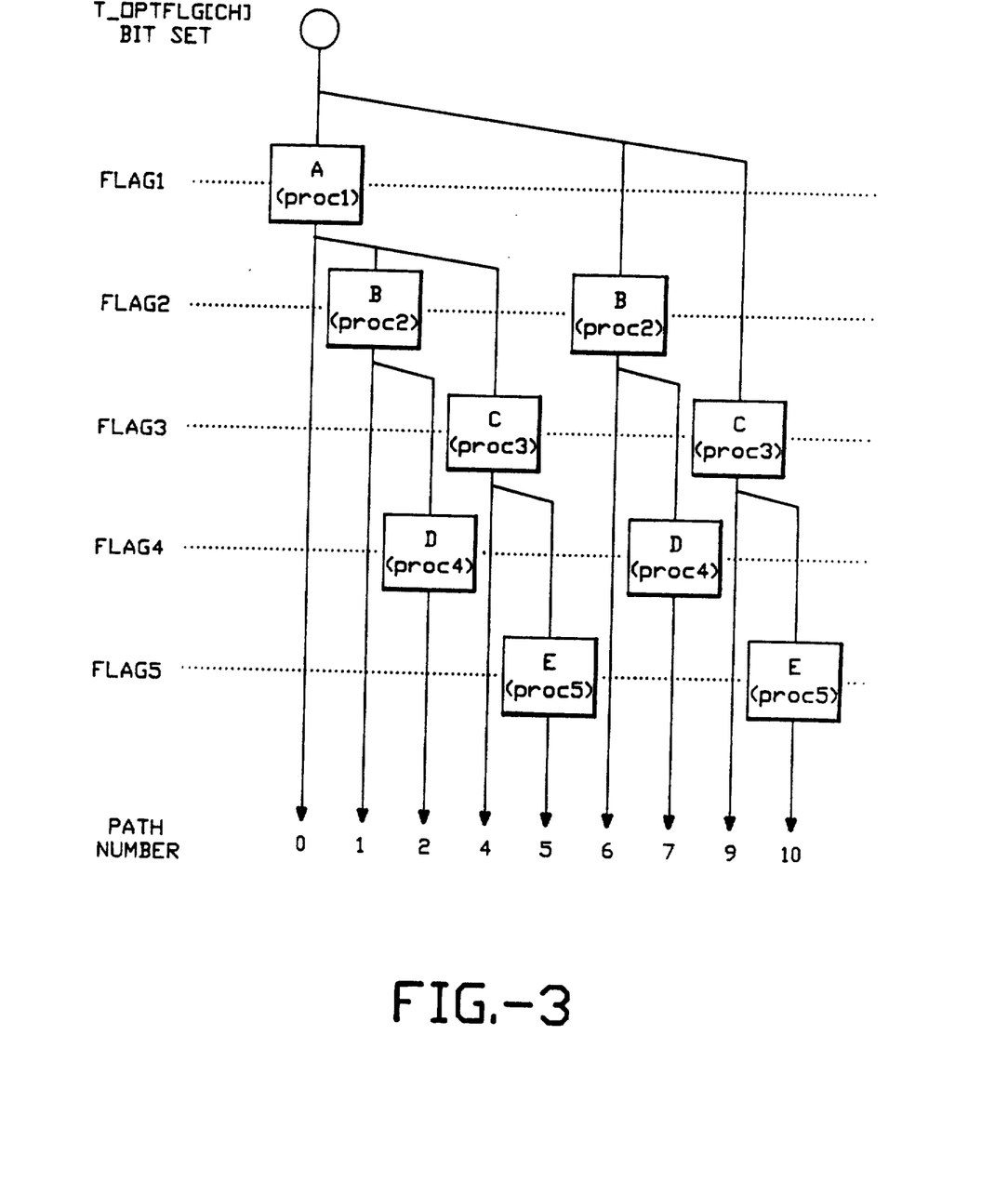
FIG. 3 illustrates the data processing flow of the channels according to the preferred embodiment of the invention.
Figure 5:
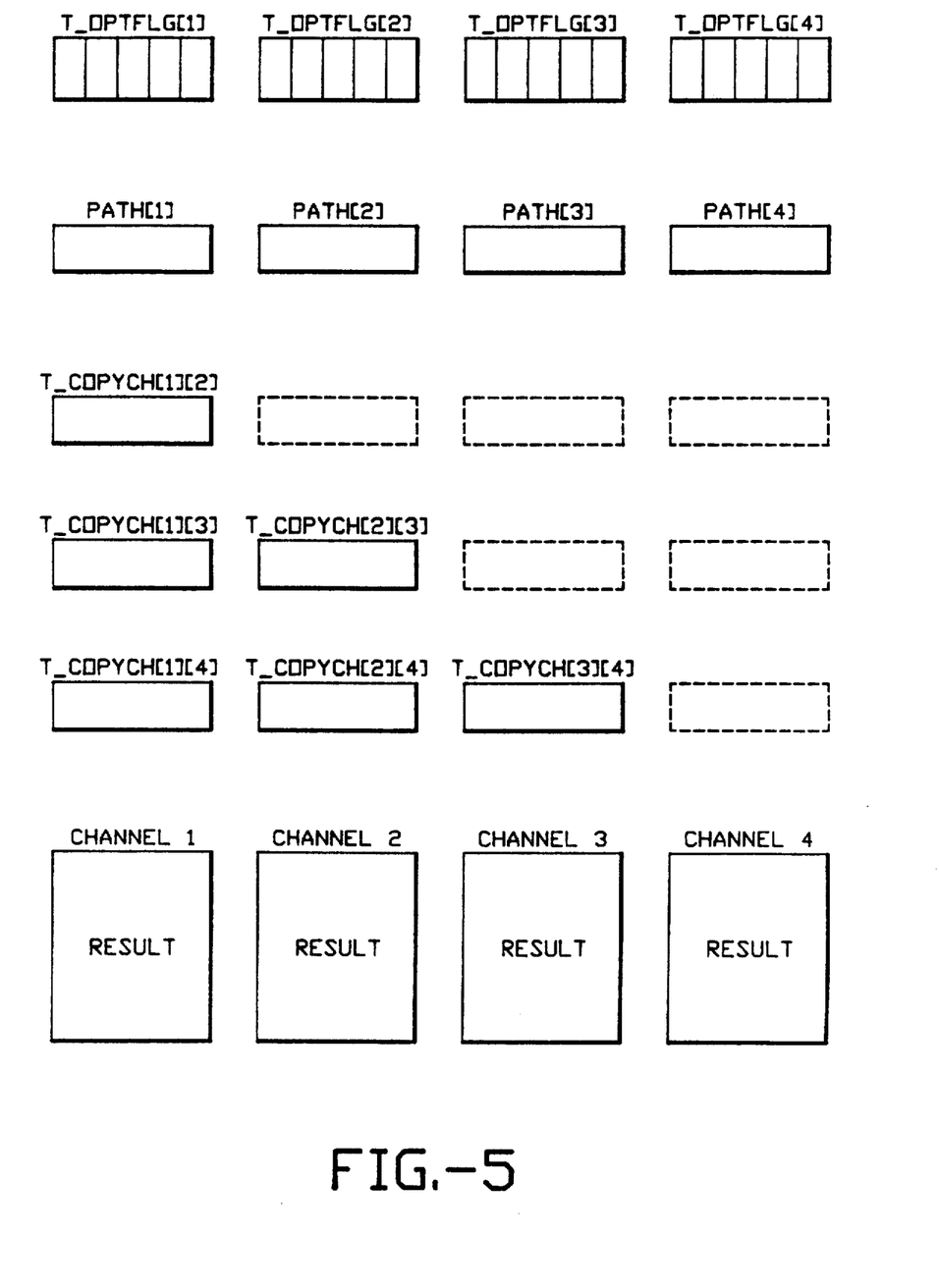
FIG. 5 illustrates the data sets used for implementing the preferred embodiment.

FIG. 2 illustrates the steps for characterizing the operation by the data processing unit 18 with regard to data from a channel CH. FIG. 5 illustrates the data sets set up in the memory 19 for implementing the preferred embodiment of the present invention. The flag, t_modflg[CH], is first examined at initialization to determine the process steps required for a channel. Next, an array, t_optflg]CH], is set to register the processing steps that need to be performed for the channel. The specified operation of a channel is further mapped onto one of a plurality of combinations of process steps. The combinations of process steps according to this preferred embodiment are illustrated in FIG. 3. Each combination is assigned a path number to distinguish it from other combinations.

When the t_modflg[CH] flag is examined, the path number corresponding to the operation of a channel is determined. This path number is stored in the memory 19 at a location path[CH]. For example, if a channel operation requiring process steps A, C, and E is specified, a path number 5 will be set in path[CH], in accordance with FIG. 3. Also, flags FLAG1, FLAG3 and FLAG5 are registered in the corresponding t_optflg[CH] array. The path number is used to characterize the process flow of a channel operation and prequalify it for comparison with other channel operations for optimization.

An implementation of the flowchart steps of FIG. 2 is illustrated in the C Programming Language source code listing in Appendix A. At the beginning, the flag t_modflg[CH] of a channel is transferred to a temporary buffer, a_byte. The content of this temporary buffer, a_byte, is compared with a set of defined constants to determine which process steps are required for the channel. Based upon this comparison, the t_optflg[CH] and the path[CH] flags of the channel CH are set.

Figure 4:
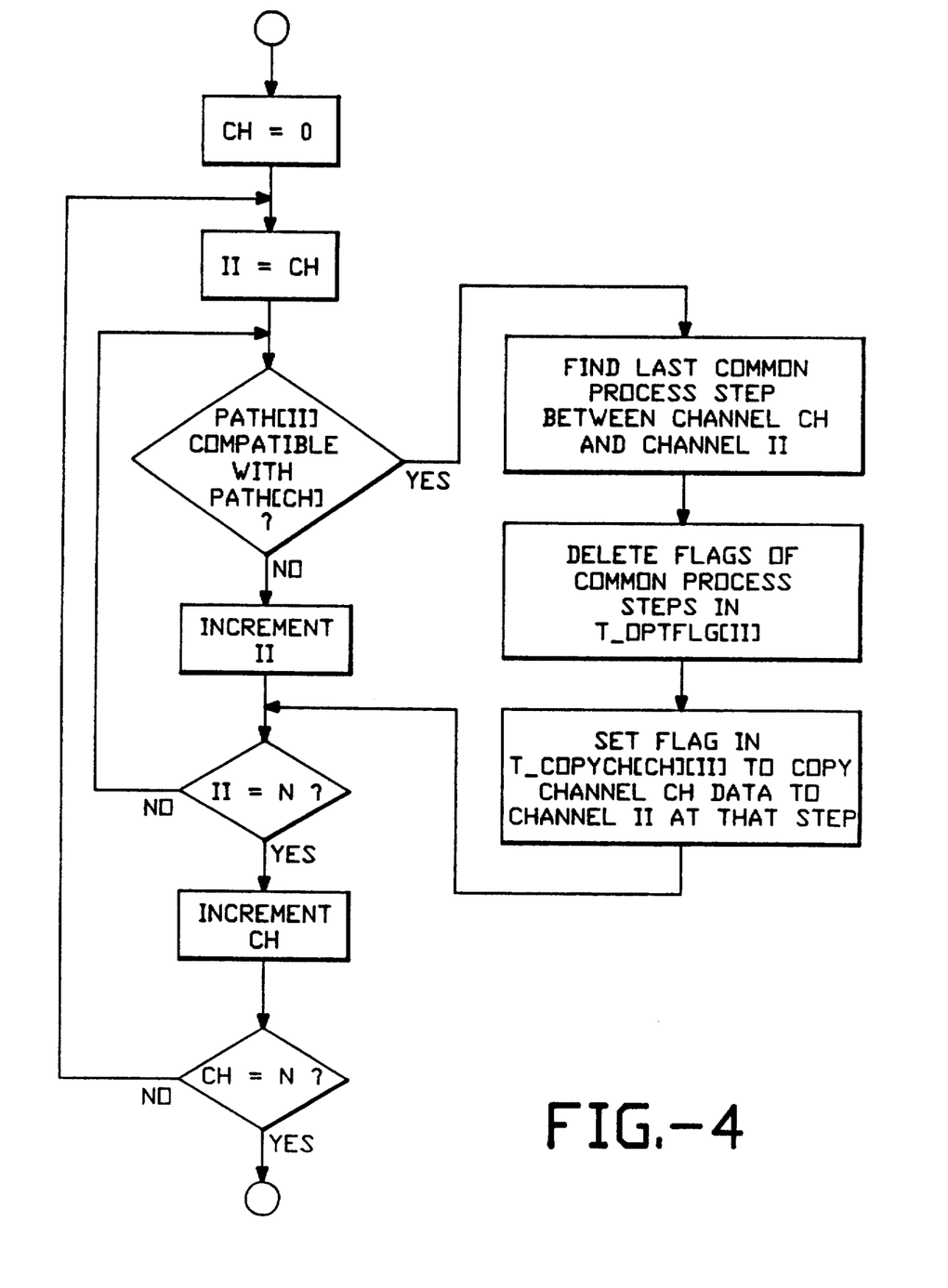
FIG. 4 is a flowchart of the steps for eliminating redundant process steps in the data processing system of a network analyzer which embodies the present invention.

After the respective channel operations have been characterized, an optimization procedure is performed. The logical steps of this optimization procedure are generally illustrated in the flowchart of FIG. 4.

During the optimization procedure, the path number path[II of a channel II is first compared with the path numbers of its preceding channels to determine their commonality.

Referring to the C Language source code listing in Appendix A, the above-mentioned comparison is performed by first comparing the path numbers of two channels to determine whether they belong to the same subgroup. If the path numbers of a channel, II, and channel, CH, fall within the same subgroup, then the t_optflg[II] entries of channel II will be compared with the t_optflg[CH] entries of channel CH to further determine their commonality. For example, if a channel (say channel 1) operation comprises process steps A, C and E, and another channel (say channel 2) operation comprises process steps A and C, then, according to FIG. 3, the path number of channel 1 will be 5, the path number of channel 2 will be 4, and the last common process step between the two channels (referring to FIG. 3) will be step C.

After the commonality between two channels has been determined, the process steps of a channel, II, which are common to the process steps of an earlier channel, CH, will be bypassed. Bypassing is accomplished by deleting or clearing entries from the t_optflg[II] flag of channel II so that the data processing unit 18 will not execute, for the channel II, the common process steps whose t_optflg[II] entries are cleared, those process steps having already been executed for channel CH. In the above example where step C is the last common process step between channel 1 (which has a path number 5) and channel 2 (which has a path number 4), entries FLAG1, corresponding to step A, and FLAG3, corresponding to step C, will be deleted from t_optflg[2] of channel 2.

Thus, the process steps of channel II which are common with respect to process steps of earlier channels will not be executed. Instead, the results from earlier channels will be shared.

A flag, t_copych[CH][II], is provided in memory 19 to indicate what results from an earlier channel, CH, need be shared with a subsequent channel, II. The flag t_copych[CH][II] is set during the optimization procedure when commonality between channels II and CH was determined. Using the above example, the flag t_copych[1][2] will be set to FLAG3, to indicate that after channel 1 has executed the process step FLAG3, its results will be communicated to channel 2.

Referring to the C Programming Language source code of Appendix A along with FIG. 5, processing of data for a channel CH is based upon entries registered in its t_optflg[CH] flag. In performing a process step, the intermediate result from that process step is stored in a memory location reserved for that channel. Upon completion of a process step, a routine copychan(match_flag) is executed. In this routine, the t_copych[CH][II] entries of the channel CH are examined, if an entry in t_copych[CH][II] matches the process step which has just been completed, the results of channel CH will be copied tot he memory location reserved for channel II at the end of the process step. Using the above example, therefore, upon completion of process step C, (specified as FLAG3), the results of channel 1 will be transferred to channel 2, which will then bypass the execution of process steps A and C.

Thus, in the processing of data on channel II, process steps that are common to other channels are skipped, and the results of these common process steps are obtained from these other channels so that duplicate or redundant processing can be eliminated.

The foregoing description of the preferred embodiment of the present invention has been presented for purposes of illustration and description. It is not intended to be exhaustive or to limit the invention to the precise form disclosed. Obviously, many modifications and variations will be apparent to practitioners skilled in this art. The embodiment was chosen and described in order to best explain the principles of the invention and its practical application, thereby enabling others skilled in the art to understand the invention for various embodiments and with various modifications as are suited to the particular use contemplated. It is intended that the scope of the invention be defined by the accompanying claims and their equivalents.

SOFTWARE APPENDIX
Copyright WILTRON 1988
37 C.F.R. §1.96(a)(2)(ii)

```c
/****************************************************************
      routine to perform dynamic cross-channel optimization
****************************************************************/
void optimize()
{ register int ii,jj;
  unsigned char path[4], a_byte;

/* reset variables */
  t_optflg[0] = t_optflg[1] = t_optflg[2] = t_optflg[3] = 0;
  for (ii=0; ii < 4; ii++)
    for (jj=0; jj < 4; jj++)
      t_copych[ii][jj] = FALSE;

/* characterize process path without optimization
       for each channel */
  for (ch=0; ch < 4; ch++0)
  { a_byte = t_modflg[ch];
    if (chan_flag[ch])
    { if (a_byte & DC0)
        t_optflg[ch] = FLAG1;
      if (a_byte & DC1)
        path[ch] = 0;
      else
      { if (a_byte & DC3)
        { t_optflg[ch] = FLAG3;
          path[ch] = 4;
          if (a_byte & DC5)
          { t_optflg[ch] = FLAG5;
            path[ch] = 5;
          }
        }
        else
        { t_optflg[ch] = FLAG2;
          path[ch] = 1;
          if ((a_byte & DC4) && (a_byte & DC2))
          { t_optflg[ch] = FLAG4;
            path[ch] = 2;
          }
        }
      }
    }
    else
    { if (a_byte & DC3)
      { t_optflg[ch] = FLAG3;
        path[ch] = 9;
        if (a_byte & DC5)
        { t_optflg[ch] = FLAG5;
          path[ch] = 10;
        }
      }
      else
```

```
      { t_optflg[ch] = FLAG2;
        path[ch] = 6;
        if ((a_byte & DC4) && (a_byte & DC2))
        { t_optflg[ch] = FLAG4;
          path[ch] = 7;
        }
      }
    }
  }
} .

/* optimize process paths */
  for (ch = 0; ch < 3; ch++)
  { if (chan_flag[ch])
    { for (ii = ch+1; ii < 4; ii++)
      { if (chan_flag[ii])
        { if ((path[ch] < 6) && (path[ii] < 6))
          { if ((path[ch] > 3) && (path[ii] > 3))
            { if ((t_optflg[ii] & FLAG3) &&
                  (t_optflg[ch] & FLAG3))
              { if ((t_optflg[ii] & FLAG5) &&
                    (t_optflg[ch] & FLAG5))
                { t_optflg[ii] &= ~(FLAG1:FLAG3:FLAG5);
                  t_copych[ch][ii] = FLAG5;
                }
                else
                { t_optflg[ii] &= ~(FLAG1:FLAG3);
                  t_copych[ch][ii] = FLAG3;
                }
              }
            }
            else if ((path[ch] <= 3) && (path[ii] <= 3))
            { if ((t_optflg[ii] & FLAG4) &&
                  (t_optflg[ch] & FLAG4))
              { if ((t_optflg[ii] & FLAG5) &&
                    (t_optflg[ch] & FLAG5))
                { t_optflg[ii] &= ~(FLAG1:FLAG2:FLAG4:FLAG5);
                  t_copych[ch][ii] = FLAG5;
                }
                else
                { t_optflg[ii] &= ~(FLAG1:FLAG2:FLAG4);
                  t_copych[ch][ii] = FLAG4;
                }
              }
            }
          }
          if ((t_optflg[ii] & FLAG2) && (t_optflg[ch] & FLAG2))
          { t_optflg[ii] &= ~(FLAG1:FLAG2);
            t_copych[ch][ii] = FLAG2;
          }
          if ((t_optflg[ii] & FLAG1) && (t_optflg[ch] & FLAG1))
          { t_optflg[ii] &= ~(FLAG1);
            t_copych[ch][ii] = FLAG1;
          }
```

```
            }
         else if ((path[ch] >= 6) && (path[ii] >= 6))
            { if ((path[ch] > 8) && (path[ii] > 8))
               { if ((t_optflg[ii] & FLAG3) &&
                     (t_optflg[ch] & FLAG3))
                  { if ((t_optflg[ii] & FLAG5) &&
                        (t_optflg[ch] & FLAG5))
                     { t_optflg[ii] &= ~(FLAG3:FLAG5);
                       t_copych[ch][ii] = FLAG5;
                     }
                     else
                     { t_optflg[ii] &= ~(FLAG3);
                       t_copych[ch][ii] = FLAG3;
                     }
                  }
               }
               else if ((path[ch] <= 8) && (path[ii] <= 8))
               { if ((t_optflg[ii] & FLAG4) &&
                     (t_optflg[ch] & FLAG4))
                  { if ((t_optflg[ii] & FLAG5) &&
                        (t_optflg[ch] & FLAG5))
                     { t_optflg[ii] &= ~(FLAG2:FLAG4:FLAG5);
                       t_copych[ch][ii] = FLAG5;
                     }
                     else
                     { t_optflg[ii] &= ~(FLAG2:FLAG4);
                       t_copych[ch][ii] = FLAG4;
                     }
                  }
               }
               if ((t_optflg[ii] & FLAG2) &&
                   (t_optflg[ch] & FLAG2))
                  { t_optflg[ii] &= ~(FLAG2);
                    t_copych[ch][ii] = FLAG2;
                  }
            }
         }
      }
   }
}  /* end of routine optimize */

/*****************************************************************
      routine to process the channel data
*****************************************************************/
void main(chan)
   int chan;
{ void proc1(), proc2(), proc3(), proc4(), proc5(), copychan();
   int ii, jj;

ch = chan;
```

```
  if (t_optflg[ch] & FLAG1)
  { proc1();
    copychan(FLAG1);
  }
  if ((t_modflg[ch] & DC1) == 0)
  { if (t_optflg[ch] & FLAG2)
    { proc2();
      copychan(FLAG2);
    }
    if (t_optflg[ch] & FLAG3)
    { proc3();
      copychan(FLAG3);
    }
    if (t_optflg[ch] & FLAG4)
    { proc4();
      copychan(FLAG4);
    }
    if (t_optflg[ch] & FLAG5)
    { proc5();
      copychan(FLAG5);
    }
  }
}
  /* end of routine main */

/***************************************************************
    routine to copy data to other channel specified by
    t_copych[ch] for cross-channel optimization
***************************************************************/ void copychan(match_flag)
  unsigned char match_flag;
  register int ii, jj;
  int ij;

for (ij = ch+1; ij < 4; ij++)
  { if (t_copych[ch][ij] == match_flag)
    { for (ii = strtswpptr, jj = 0; ii <= endswpptr; ii++)
      { if (freqflag[ii] & t_freqmask)
        { dispreal[ij][ii] = t_xr[jj];
          dispimag[ij][ii] = t_xi[jj];
          ++jj;
        }
      }
    }
  }
}
  /* end of routine copychan */
```

Attorney Docket No.: WILT6352/MCF/RCC
VP1/RCC/WILT/6352.004     -14-

I claim:
1. A method in a data processing system for optimizing processing of a given set of data with more than one operation selectable based upon a selection specification to produce more than one result, comprising the steps of:
(a) partitioning each operation of the system into at least one process step;
(b) sharing results of common process steps between at least a first and a second operations; and
(c) bypassing execution of said common process steps in one of said first and second operations.

2. The method as in claim 1, wherein:
(a) said step of sharing results includes,
 (i) mapping a selection specification of an operation into a sequence of process steps,
 (ii) identifying commonality between respective sequences of process steps of the first and the second operations, and
 (iii) upon completion of at least a first process step in an earlier operation to produce an intermediate result, communicating said intermediate result to a subsequent operation having a process step equivalent to said first process step; and
(b) said bypassing step includes,
 (i) upon receiving said intermediate result, bypassing execution of said first process step in said subsequent operation.

3. The method as in claim 2, wherein said mapping step further includes the step of assigning a path number to a sequence of process steps.

4. The method as in claim 3, wherein said step of identifying commonality between a first and a second operations includes a comparison of respective path numbers assigned to the sequences of process steps of said first and second operations.

5. The method as in claim 4, wherein said step of sharing results between a first and a second operations comprises:
(a) storing a list of process steps that need to be executed in each operation;
(b) upon determining that a commonality exists between the respective sequences of process steps that need to be executed in said first and said second operations, identifying process steps which are common between said first and second operations;
(c) deleting said common process steps from the list of process steps of said second operations; and
(d) upon completion of said common process steps by said first operation, transferring results of said common process steps to said second operation.

6. The method of claim 2, wherein:
said first process step of said first operation and said equivalent process step of said second operation may each include a plurality of process steps, such that said first and second operations each begins with a same sequence of more than one common process steps;
said intermediate result which is communicated to said second operation is a result of said sequence of more than one common process steps of said first operation; and
said step of bypassing execution of said sequence of more than one common process steps of said second operation.

7. An apparatus in a data processing system for optimizing processing of a given set of data by more than one operation selectable based on upon a selection specification to produce more than one result, comprising:
(a) means for performing operations of the system in at least one process step;
(b) means for sharing results of common process steps between at least a first and a second operations; and
(c) means for bypassing execution of said common process steps in one of said first and second operations.

8. The apparatus as in claim 7, wherein:
(a) said means for sharing results includes,
 (i) means for mapping a selection specification of an operation into a sequence of process steps,
 (ii) means for identifying commonality between respective sequences of process steps of the first and the second operations, and
 (iii) means responsive to a completion of at least a first process step in a first operation to produce an intermediate result, for communicating said intermediate result to a second operation having a process step equivalent to said first process step; and
(b) said means for bypassing further comprises being responsive to receiving said intermediate result.

9. The apparatus as in claim 8, wherein said means for mapping a selection specification includes means for storing an individual path number of a sequence of process steps.

10. The apparatus as in claim 9, further including means for comparing path numbers of said first and second operations to identify commonality between the sequences of process steps required for said first and second operations.

11. The apparatus as in claim 7, wherein said means for sharing results between said first and second operations comprises:
(a) means for storing a list of process steps that need to be executed for each respective operation;
(b) means for determining whether there exists a commonality between the sequences of process steps in the stored lists of said first and second operations and for identifying process steps which are common between said first and second operations;
(c) means for deleting said common process steps from the list of process steps of said second operation; and
(d) means, responsive to completion of said common process steps of said first operation, for transferring the results of said common process steps to said second operation.

12. The apparatus as in claim 11, wherein:
(a) said means for performing operations further comprises means for storing a settable and clearable flag for each process step of each operation, wherein said means for performing executes a given process step in a given operation if the step's corresponding flag is set and does not execute the given process step if the corresponding flag is cleared;
(b) means for setting all flags of an operation upon initiation of execution of said operation by said means for performing; and
(c) said means for deleting deletes said common process steps of said second operation, by clearing their corresponding flags, before said means for performing executes said second operation.

13. The apparatus as in claim 12 or 19, wherein:
(a) said means for transferring results further comprises a data storage area dedicated to each respective operation; and
(b) said means for performing further comprises:

(i) controllable means for writing an intermediate result of a given process step of a first operation into the data storage area detected to a second operation, (ii) means for reading said intermediate result from said data storage area, (iii) means for invoking said means for writing upon completion of a common process step in said first operation, and (iv) means, responsive to said means for bypassing having bypassed said common process step in a second operation, for invoking said means for reading during execution of said second operation to read the intermediate result of said common process step executed in said first operation, said means for performing delaying performance of said second operation until said intermediate result is read.

14. In a network analyzer having more than one channel for analyzing a device under test, an apparatus within the network analyzer for optimizing data processing operations by the analyzer on channel data, said apparatus comprising:

(a) means for performing the data processing operations of the analyzer in at least one process step;

(b) means for sharing results of common process steps between operations on channel data of a first and a second channels; and (c) means for bypassing execution of said common process steps in the operation on channel data of one of said first and second channels.

15. The apparatus as in claim 14, wherein:

(a) said means for sharing results includes, (i) means for mapping a test option into a sequence of process steps, (ii) means for identifying commonality between respective sequences of process steps in the operations on channel data of at least a first and a second channels, and (iii) means, responsive to a completion of at least a first process step in the operation of an earlier channel to produce an intermediate result, for communicating said intermediate results to the operation of a subsequent channel having a process step equivalent to said first process step; and (b) said means for bypassing is responsive to receiving said intermediate result, for bypassing execution of said equivalent process step in the operation of said subsequent channel in response to receipt of said intermediate result.

16. The apparatus as in claim 15, wherein said means for mapping a test option includes means for restoring an individual path number of said sequence of process steps.

17. The apparatus as in claim 16, further including means for comparing path numbers being assigned to the operations of said first and second channels to identify whether commonality exists between the sequences of process steps required for the operations of said first and said second channels.

18. The apparatus as in claim 14, wherein said means for sharing results between the operations of said first and second channels comprises:

(a) means for storing a list of process steps that need to be executed for each respective operation;

(b) means for determining whether there exists a commonality between the sequences of process steps in the stored lists of the respective operations of said channels and for identifying process steps which are common between said respective operations;

(e) means for deleting said common process steps from the list of process steps of said operation of said second channel; and (d) means, responsive to completion of said common process steps of the operation of said first channel, for transferring the results of said common process steps to the operation of said second channel.

19. The apparatus as in claim 18, wherein:

(a) said means for performing operations further comprises means for storing a settable and clearable flag for each process step of the operation of each channel, wherein said means for performing executes a given process step in the operation of a given channel if the step's corresponding flag is set and does not execute the given process step if the corresponding flag is cleared;

(b) means for setting all flags of the operation of a channel upon initiation of execution of said operation by said means for performing; and (c) said means for deleting deletes said common process steps of said operation of said second channel, by clearing their corresponding flags, before said means for performing executes said operation of said second channel.

20. In a network analyzer having more than one channel for analyzing a device under test by a plurality of operations, a method for optimizing the processing of data of the channels, said method comprising the steps of:

(a) partitioning each operation of the analyzer into at least one process step;

(b) sharing results of common process steps between at least a first and a second operations; and (c) bypassing execution of said common process steps in one of said first and second operations.

21. The method as in claim 20, wherein;

(a) said step of sharing results includes:

(i) mapping a selection specification of each operation into a sequence of process steps, (ii) identifying commonality between respective sequences of process steps of the first and the second operations, and (iii) upon completion of at least a first process step in an earlier operation to produce an intermediate result, communicating said intermediate result to a subsequent operation having a process step equivalent to said first process step; and (d) said means for bypassing bypasses, upon receiving said intermediate result, said equivalent process step in said subsequent operation.

22. The method as in claim 21, wherein said mapping step further includes the step of assigning a path number to the sequence of process steps.

23. The method as in claim 22, wherein said step of identifying commonality between a first and a second operations includes a comparison of respective path numbers assigned to the sequences of process steps of said first and second operations.

24. The method as in claim 23, wherein said step of sharing results between said first and second operations comprises:

(a) storing a list of process steps that need to be executed in each respective operation;

(b) determining whether a commonality exists between the respective sequences of process steps in the lists of said first and second operations, and responsive to a determination of existing commonality, identifying process steps which are common between said first and second operations;

(c) deleting said common process steps from the list of process steps of said second operation; and (d) upon completion of said common process steps by said first operation, transferring results of said common process steps to said second operation.

25. The method of claim 21, wherein:

said first process step of said first operation and said equivalent process step of said second operation may each include a plurality of process steps, such that said first and second operations each begins with a same sequence of more than one common process steps;

said intermediate result which is communicated to said second operation is a result of said sequence of more than one common process steps of said earlier operation; and said step of bypassing bypasses execution of said sequence of more than one common process steps of said subsequent operation.

26. A method of enabling a data processing device to perform a plurality of operations upon data to produce a plurality of results, each operation including an initial sequence of one or more process steps which processes said data to produce an intermediate result, each operation further including zero or more subsequent process steps which process the intermediate result of their operation's initial sequence of process steps to produce an end result, said method comprising the unordered steps of:

(a) providing said device with means for ascertaining whether a first operation of said plurality includes an initial sequence of process steps which is the same as an initial sequence of process steps of a second operation of said plurality, said initial sequence of process steps being a common sequence of process steps if included as the initial sequence of process steps in both said first and second operations;

(b) providing said device with means for executing said initial sequence of process steps of said first operation to produce an intermediate result;

(c) providing said device with means; responsive to said means for ascertaining and said means for executing, for saving said intermediate result conditionally upon said means for ascertaining having ascertained that said initial sequence of process steps is common to said first and second operations;

(d) adapting said means for executing to further execute the zero or more subsequent process steps of said first operation after said means for executing has executed said initial sequence of process steps of said first operation;

(e) providing said means for further executing with means for avoiding execution, in the execution of said second operation, of the common sequence of process steps;

(f) adapting said means for executing to execute the zero or more subsequent process steps of said second operation after said initial sequence of process steps of said first operation has been executed, responsive to said means for ascertaining; and (g) providing said means for executing with means for causing said zero or more subsequent process steps of said second operation to process the intermediate result of said initial sequence of process steps of said first operation.

27. The method of claim 26, wherein said step of providing said means for ascertaining comprises the steps of:

providing said device with a given set of operations;

indicating a predefined division of each operation into said process steps;

providing said means for ascertaining with are predefined mapping of process step commonality for the given set of operations, and with means for using said mapping to perform the ascertaining.

28. The method of claim 26, wherein said step of providing said means for saving comprises the steps of:

incorporating into each operation of said plurality of storage (dispreal[][], dispimag) for holding an intermediate result from another operation.

29. The method o claim 26, wherein:

(a) said step of providing said means for avoiding comprises the steps of, (i) incorporating into each given operation of said plurality of set of settable and clearable flags (t_optflg[]) which control execution of the process steps in the given operation, individual flags corresponding to individual process steps, a set flag indicating that its corresponding process step is to be performed and a clear flag indicating that its corresponding process step is not to be performed, (ii) providing said device with means for setting, before execution of said operations, specific individual flags in each given operation's set of flags, to indicate those process steps which are normally required in said given operation.

(iii) providing said device with means for clearing in the set of flags of said second operation, in response to said means for ascertaining, one or more specific flags which correspond to the initial sequence of process steps which are second operation has in common with said first operation.

30. The method of claim 29, wherein said step of providing said means for saving comprises the steps of:

incorporating into each given operation of said plurality a storage (dispreal[][], dispimag[][]) for holding an intermediate result from another operation;

providing said device with a second set of indicators (t_copych[][]), each of which is associated with an earlier operation and a later operation, and which may hold a process step identifier indicating that after the identified process step of the earlier operation is executed, an intermediate result of said identified process step is to be saved for use by said later operation;

adapting said means for clearing with means for loading said second set of indicators with a process step identifier indicating that after execution, in said first operation, of the initial sequence of process steps which said first operation has in common with said second operation, an intermediate result of said common process steps is to be saved in the means for saving of said second operation.

* * * * *